(12) United States Patent
Naito et al.

(10) Patent No.: US 8,503,727 B2
(45) Date of Patent: Aug. 6, 2013

(54) MONITORING CAMERA TERMINAL (75) Inventors: Takeshi Naito, Kyoto (JP); Shunsuke Kamijo, Tokyo (JP); Kaichi Fujimura, Tokyo (JP)

(73) Assignees: OMRON Corporation, Kyoto (JP); The University of Tokyo, Tokyo (JP)

( * ) Notice: Subject to any disclaimer, the term of this patent is extended or adjusted under 35 U.S.C. 154(b) by 128 days.

(21) Appl. No.: 13/266,093

(22) PCT Filed: Apr. 5, 2010

(86) PCT No.: PCT/JP2010/056161
§ 371 (c)(1),
(2), (4) Date: Oct. 24, 2011

(87) PCT Pub. No.: WO2011/010490
PCT Pub. Date: Jan. 27, 2011

(65) Prior Publication Data
US 2012/0045096 A1 Feb. 23, 2012

(30) Foreign Application Priority Data

Jul. 22, 2009 (JP) ................................. 2009-171329

(51) Int. Cl.
*G06K 9/00* (2006.01)
*G06F 15/173* (2006.01)
(52) U.S. Cl.
USPC ............................ 382/103; 382/291; 709/224

(58) Field of Classification Search
USPC ................. 382/100, 103, 106–107, 115–117, 382/155, 162, 168, 170, 173, 181, 189, 199, 382/203, 219, 232, 254, 274, 276, 291, 305, 382/312; 370/352; 709/204, 224
See application file for complete search history.

(56) References Cited

U.S. PATENT DOCUMENTS 5,999,525 A * 12/1999 Krishnaswamy et al. ..... 370/352
7,672,510 B2 * 3/2010 Nagaoka et al. .............. 382/170
(Continued)

FOREIGN PATENT DOCUMENTS

| JP | 10-255057 A | 9/1998 |
| JP | 2002-290962 A | 10/2002 |

(Continued)

OTHER PUBLICATIONS

Y. Hyodo et al., "Robust Multiple-human Tracking against Occlusion through Camera Network," IPSJ SIG Technical Reports 2008-CVIM-164, Computer Vision and Image Media, Aug. 29, 2008, vol. 2008, No. 82, pp. 171-176, 6 pages.

(Continued)

*Primary Examiner* — Seyed Azarian
(74) *Attorney, Agent, or Firm* — Osha Liang LLP (57) ABSTRACT

A monitoring camera terminal has an imaging portion for imaging a monitoring target area allocated to an own-terminal, an object extraction portion for processing a frame image imaged by the imaging portion to extract an imaged object, an ID addition portion for adding an ID to the object extracted by the object extraction portion, an object map creation portion for creating, for each object extracted by the object extraction portion, an object map associating the ID added to the object with a coordinate position in the frame image, and a tracing portion for tracing an object in the monitoring target area allocated to the own-terminal using the object maps created by the object map creation portion.

19 Claims, 10 Drawing Sheets

U.S. PATENT DOCUMENTS

| | | | |
|---|---|---|---|
| 8,194,646 B2 * | 6/2012 | Elliott et al. | 370/352 |
| 2007/0198638 A1 * | 8/2007 | Omura et al. | 709/204 |

FOREIGN PATENT DOCUMENTS

| | | | |
|---|---|---|---|
| JP | 2003-276963 A | | 10/2003 |
| JP | 2003276963 | * | 10/2003 |
| JP | 2003-324720 A | | 11/2003 |
| JP | 2003324720 | * | 11/2003 |
| JP | 2004-072628 A | | 3/2004 |

OTHER PUBLICATIONS

Patent Abstracts of Japan, Publication No. 2003-276963, dated Oct. 2, 2003, 1 page.

Patent Abstracts of Japan, Publication No. 10-255057, dated Sep. 25, 1998, 1 page.

Patent Abstracts of Japan, Publication No. 2004-072628, dated Mar. 4, 2004, 1 page.

Patent Abstracts of Japan, Publication No. 2002-290962, dated Oct. 4, 2002, 1 page.

Patent Abstracts of Japan, Publication No. 2003-324720, dated Nov. 14, 2003, 1 page.

International Search Report issued in PCT/JP2010/056161, mailed on Apr. 27, 2010, with translation, 4 pages.

* cited by examiner

| TIME STAMP | PERSON A | | PERSON B | | ○○○○ |
|---|---|---|---|---|---|
| | ID | COORDINATE | ID | COORDINATE | ○○○○ |
| 20:11:15:238 | (a1001) | (a1,b1) | (a1002) | (a2,b2) | ○○○○ |

MONITORING CAMERA TERMINAL

BACKGROUND

1. Technical Field

This invention relates to a monitoring camera terminal that images a monitoring target area and processes the resulting frame image to trace an object such as a suspicious person having suspicious behavior.

2. Background Art

Conventionally, in a place where general public gather together, such as a station, a shopping center, or a busy street, a plurality of monitoring camera terminals are used to detect a suspicious person having suspicious behavior (hereinafter, simply referred to as a suspicious person) or the like and to trace the detected suspicious person. When a plurality of monitoring camera terminals are used to trace a suspicious person, in response to the movement of the suspicious person, the monitoring camera terminal for tracing should be changed. In changing the monitoring camera terminal for tracing the suspicious person, the monitoring camera terminal taking over the tracing should identify the suspicious person. Failure of identifying the suspicious person causes tracing of a person different from the suspicious person that has been traced. Specifically, the detected suspicious person is lost from sight, which is a tracing failure.

To improve the identification accuracy of a suspicious person, a method is proposed as follows (see JP3814779). A first monitoring camera terminal tracing the suspicious person notifies the template information used to detect the suspicious person to a second monitoring camera terminal that takes over the tracing of the suspicious person. The second monitoring camera terminal identifies the suspicious person using the notified template information.

Another method is proposed as follows (see JP3999561). In addition to the template information, the characteristic information used to detect the suspicious person is also notified to the second monitoring camera terminal. The characteristic information includes, for example, information for identifying the suspicious person using image data, the shape, the color, the size or the like of the suspicious person extracted from the image, or the shapes or positions of the facial parts including eyes, a nose, and a mouth.

Patent Document 1: Japanese Granted Patent Publication No. 3814779

Patent Document 2: Japanese Granted Patent Publication No. 3999561

SUMMARY

Unfortunately, the first monitoring camera terminal tracing the suspicious person and the second monitoring camera terminal that takes over the tracing of the suspicious person have different angles with respect to the suspicious person as a subject. Therefore, between the suspicious person in the frame image imaged by the first monitoring camera terminal and the suspicious person in the frame image imaged by the second monitoring camera terminal, the contour of the suspicious person and the shapes and positions of the facial parts are different. If, therefore, the template information and characteristic information used to detect the suspicious person are notified from the first monitoring camera terminal to the second monitoring camera terminal, the second monitoring camera terminal cannot ensure the identification accuracy of the suspicious person unless the second terminal can perform matching with the first terminal taking into account the angle difference.

Three-dimensional information of the suspicious person as a subject can be used to perform the matching taking into account the angle difference. Three-dimensional information of the suspicious person should be obtained using a stereo camera. This increases the cost of the individual monitoring camera terminal and thus the cost of the entire monitoring system.

One or more embodiments of the present invention provides a monitoring camera terminal that may sufficiently ensure the identification accuracy of the traced object with respect to any other monitoring camera terminals and may sufficiently limit the cost increase.

According to one or more embodiments of the present invention, a monitoring camera terminal is configured as follows.

An object extract means processes a frame image of a monitoring target area allocated to the own-terminal to extract the imaged object. The frame image is imaged by an imaging means. The object refers here to a body such as a person or a vehicle. An ID addition means adds an ID to the object extracted by the object extract means. The ID may be any unique value that can identify the object. An object map creation means creates, for each object extracted by the object extraction means, an object map associating the ID added to the object with a coordinate position in the frame image. A tracing means traces an object in the monitoring target area allocated to the own-terminal using the object maps created by the object map creation means.

A mate-terminal object map acquisition means acquires a mate-terminal object map created by a mate-terminal through data communication with the mate-terminal, the mate-terminal having a monitoring target area allocated thereto, the monitoring target area being partially overlapping with the own-terminal monitoring target area. A coordinate transformation information storage means stores coordinate transformation information of the relative position relationship between the coordinate position of the own-terminal frame image and the coordinate position of the mate-terminal frame image. An identification means uses the coordinate transformation information stored by the coordinate transformation information storage means to transform the own-terminal-extracted object position and the mate-terminal-extracted object position into positions in a common coordinate system. The identification means identifies the objects in the overlapping area using the distances between the own-terminal-extracted objects and the mate-terminal-extracted objects in the common coordinate system.

The common coordinate system may be any coordinate system. The common coordinate system according to one or more embodiments of the present invention may be the coordinate system of either of the monitoring camera terminals (the own-terminal or the mate-terminal). In this way, only the objects registered in one of the object maps may be subjected to the coordinate transformation, thereby limiting the process load on the coordinate transformation.

Usually, if the own-terminal-extracted object and the mate-terminal-extracted object are the same object, their positions in the common coordinate system are generally the same while some amount of error is present due to factors including an angle difference and the detection accuracy. The own-terminal-extracted objects and the mate-terminal-extracted objects may thus be accurately identified using the distances between their positions.

The identification means identifies the objects in the overlapping area using, for example, among combinations associating the own-terminal-extracted objects with the mate-terminal-extracted objects in the overlapping area on a oneto-one basis, the combination providing the minimum total sum of the distances between the associated objects (the distances between their positions in the common coordinate system).

Using two types of common coordinate systems, the objects in the overlapping area may be identified using the combination having a minimum total sum in each type of coordinate system. In this case, according to one or more embodiments of the present invention, the two types of common coordinate systems are the coordinate system of the own-terminal frame image and the coordinate system of the mate-terminal frame image.

For each object extracted by the object extract means, the object position may be set to the coordinate of the relevant object in a ground plane.

A matching means may be provided for matching, in terms of time, the own-terminal object maps created by the object map creation means and the mate-terminal object maps acquired by the mate-terminal object map acquisition means using the distances between the objects in the overlapping area. The identification accuracy may thus be further improved.

The identification means may be adapted to identify the objects in the overlapping area using a plurality of object map sets, each object map set including the own-terminal object maps and the mate-terminal object maps matched by the matching means in terms of time. The object identification accuracy may thus be even further improved.

The identification means may also be adapted to calculate the distances between the own-terminal-extracted objects and the mate-terminal-extracted objects by adding, for the object map set in which the own-terminal object map is matched, by the matching means, in terms of time to a mate-terminal object map to which other own-terminal object map is also matched, a predetermined penalty distance in the calculation of the distances between the objects in the overlapping area.

Further, the object map creation means adds a time stamp at the creation time to the created object map. The time stamp is, for example, the time of imaging the frame image used in the creation of the current object map or the time of completing the object map creation. The time clocked by the own-terminal may be adjusted using the time stamps added to the own-terminal object maps and the mate-terminal object maps, the own-terminal and mate-terminal object maps being matched in terms of time by the matching means. In this configuration, the clocked time may be synchronized between the own-terminal and the mate-terminal.

According to one or more embodiments of the invention, the identification accuracy of the object such as the detected suspicious person may be sufficiently ensured and the cost increase may be sufficiently limited.

DETAILED DESCRIPTION

A monitoring system using a monitoring camera terminal according to embodiments of this invention will be described below. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
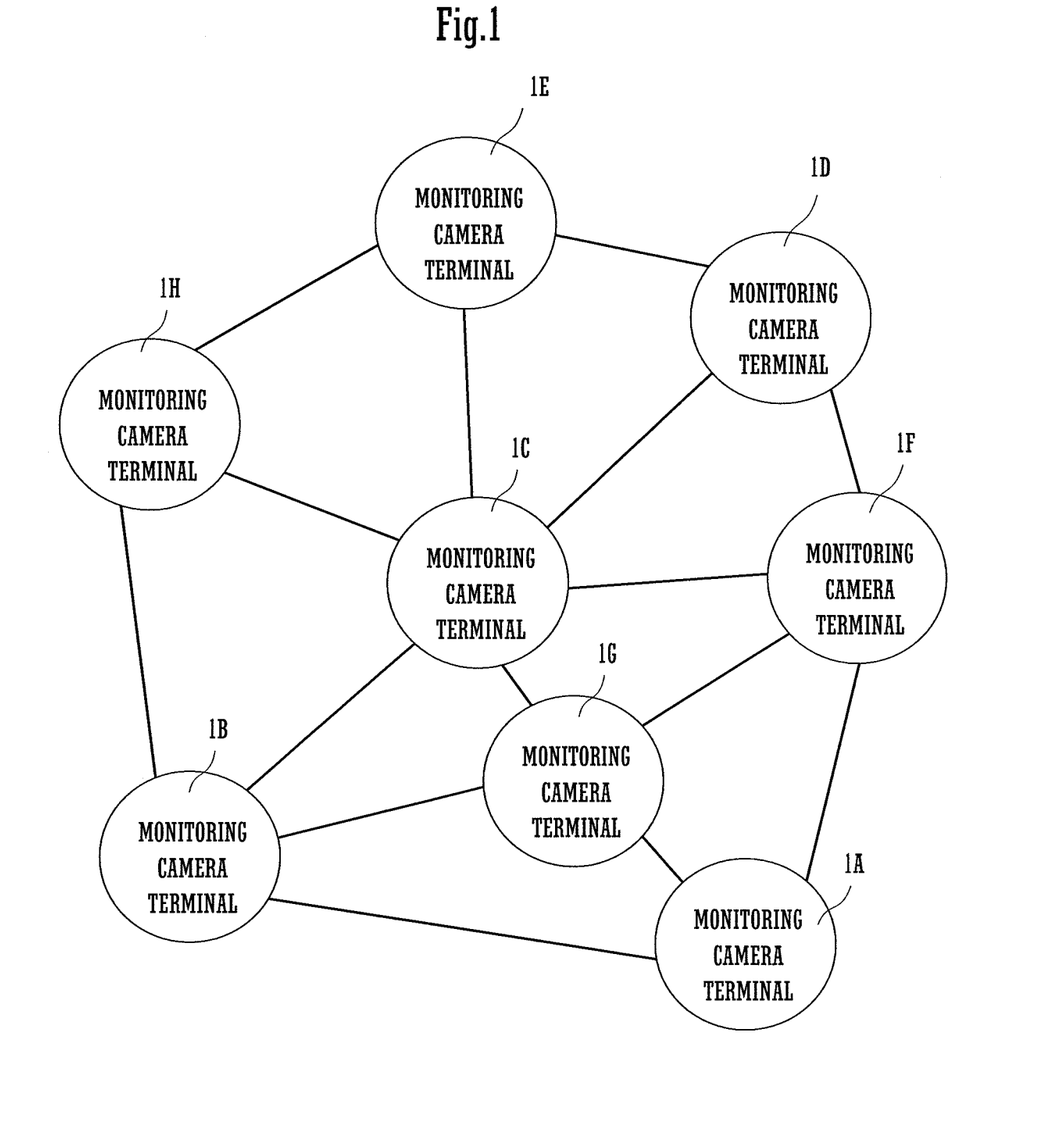
FIG. 1 is a schematic diagram of the configuration of a monitoring system.

FIG. 1 is a schematic diagram of the configuration of the monitoring system. The monitoring system is a network system having a plurality of monitoring camera terminals 1 (1A to 1H). The monitoring system is, for example, an ad-hoc network system. The monitoring camera terminals 1 may perform data communication therebetween directly or via any other monitoring camera terminals 1. The data communication between the monitoring camera terminals 1 may be wireless or wired.

Note that although FIG. 1 shows an example monitoring system having 8 monitoring camera terminals 1A to 1H, the number of monitoring camera terminals 1 included in the system is not limited to 8. The lines connecting the monitoring camera terminals 1 shown in FIG. 1 are links. In the following discussion, the monitoring camera terminals 1A to 1H are referred to as "the monitoring camera terminal(s) 1" unless they are distinguished.

Figure 2:
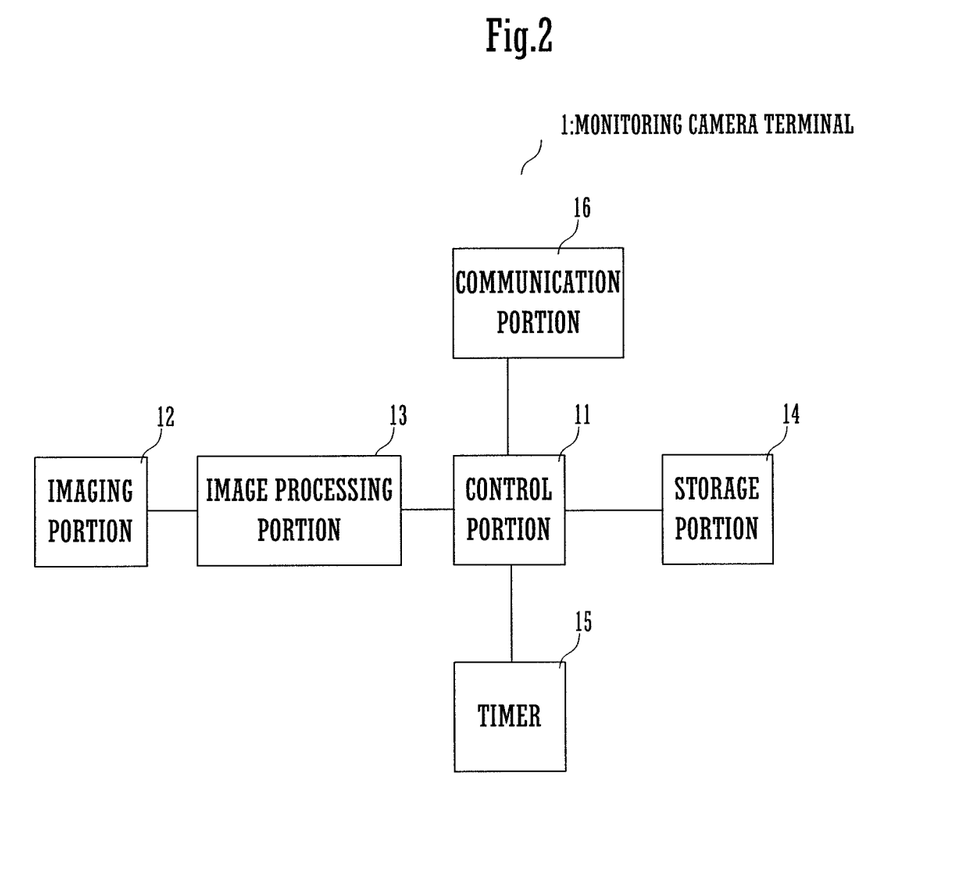
FIG. 2 is a block diagram of the configuration of the main portion of the monitoring camera terminal.

FIG. 2 illustrates the configuration of the main portion of the monitoring camera terminal. The monitoring camera terminal 1 includes a control portion 11, an imaging portion 12, an image processing portion 13, a storage portion 14, a timer 15, and a communication portion 16. The control portion 11 controls the operation of each portion of the main portion of the monitoring camera terminal 1. The imaging portion 12 images a monitoring target area allocated to the own-terminal. In other words, the imaging area of the imaging portion 12 is the monitoring target area allocated to the own-terminal. The imaging portion 12 outputs imaging images (frame images) of about 5 frames to 10 frames per second.

The image processing portion 13 processes the frame images of the monitoring target area imaged by the imaging portion 12 and extracts the imaged person (object). A plurality of temporally continuous frame images are used to trace a person moving in the monitoring target area. The image processing portion 13 uses the spatio-temporal MRF (Markov Random Field) model to extract a person or trace the extracted person. The spatio-temporal MRF model is, as is well-known, the MRF model extracted as the spatio-temporal model, focusing attention on the correlation of the spatio-temporal images in the time axis direction. The spatio-temporal MRF model is a model that divides the region of the frame image to be processed into blocks, each block including some pixels×some pixels (for example, 8 pixels×8 pixels), and that defines the correlation in the time axis direction by referring to each block's motion vector between the temporally continuous frame images.

The storage portion 14 stores data such as an operation program for operating the main portion, setting data used in operation, or processing data generated in operation. The timer 15 clocks the current time. The communication portion 16 controls data communication with any other monitoring camera terminals 1.

Figure 3:
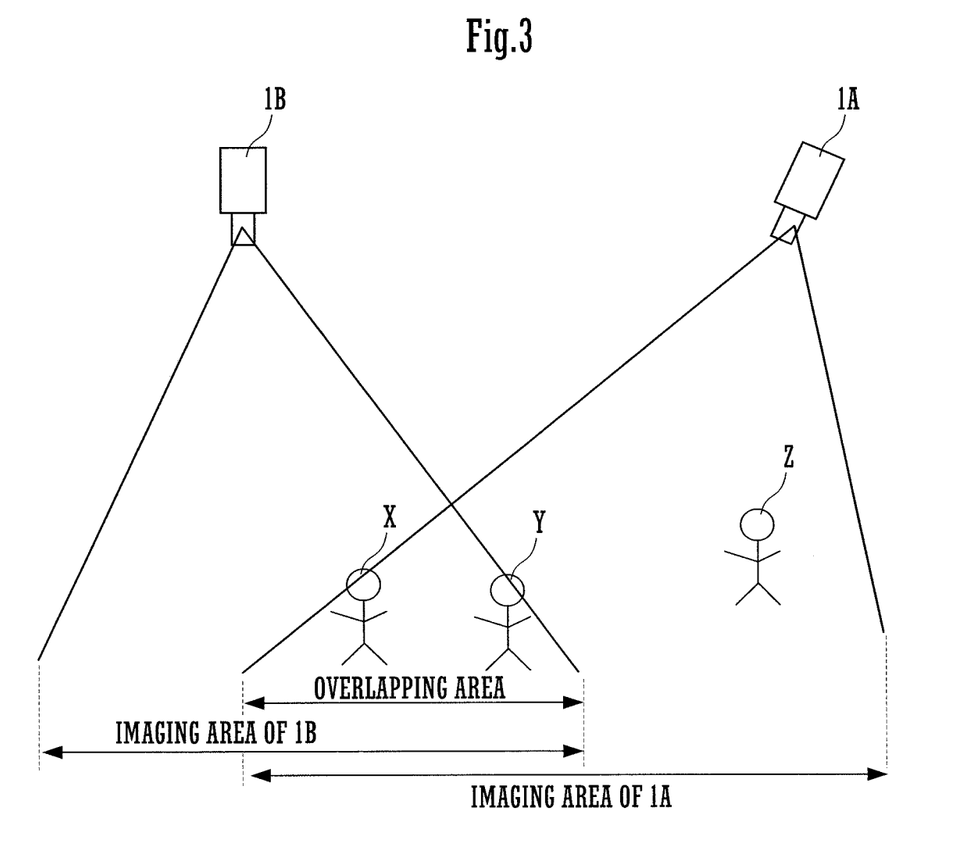
FIG. 3 illustrates imaging areas of two adjacent monitoring camera terminals.

The monitoring system is a system for tracing a person such as a suspicious person having suspicious behavior. In response to the person's movement, the system changes the monitoring camera terminal 1 for tracing. The suspicious person may thus be traced over a wide area. FIG. 3 illustrates imaging areas (monitoring target areas) of two adjacent monitoring camera terminals 1A and 1B. The two adjacent monitoring camera terminals 1A and 1B have partially overlapping imaging areas (monitoring target areas). The overlapping portion of the imaging areas is here referred to as an overlapping area. Although FIG. 3 illustrates the monitoring target areas of the two adjacent monitoring camera terminals 1A and 1B, a combination of any two other adjacent monitoring camera terminals 1 also have partially overlapping monitoring target areas. The monitoring camera terminal 1 performs an identification process that associates persons X and Y in the overlapping area with those of the adjacent other monitoring camera terminal 1 on a one-to-one basis. With reference to FIG. 3, the persons X and Y reside in the overlapping area of the monitoring camera terminals 1A and 1B, and the person Z resides in the monitoring target area of the monitoring camera terminal 1A and outside the overlapping area of the monitoring camera terminals 1A and 1B.

Note that the two monitoring camera terminals 1 having partially overlapping monitoring target areas are here referred to as adjacent monitoring camera terminals 1. The adjacent monitoring camera terminals 1 may perform data communication therebetween directly (without any other monitoring camera terminals 1 therebetween).

The monitoring camera terminal 1 does not necessarily have one adjacent other monitoring camera terminal 1. In other words, the monitoring camera terminal 1 may have 2 or 3 adjacent monitoring camera terminals 1. Note, however, that the overlapping area is different for each of the adjacent other monitoring camera terminals 1.

Each monitoring camera terminal 1 stores coordinate transformation information in storage portion 14 for each adjacent monitoring camera terminal 1. The coordinate transformation information indicates the relative position relationship between the two-dimensional coordinate system of the frame image imaged by the own-terminal's imaging portion 12 and the two-dimensional coordinate system of the frame image imaged by the imaging portion 12 of the adjacent mate monitoring camera terminal 1. The coordinate transformation information is information that provides projective transformation of the two-dimensional coordinate system of the frame image imaged by the own-terminal's imaging portion 12 and the two-dimensional coordinate system of the frame image imaged by the imaging portion 12 of the adjacent mate monitoring camera terminal 1 into the common coordinate system. Here, as the coordinate transformation information, a first coordinate transformation parameter and a second coordinate transformation parameter are stored in the storage portion 14. The first coordinate transformation parameter provides projective transformation of the two-dimensional coordinate system of the frame image imaged by the own-terminal's imaging portion 12 into the two-dimensional coordinate system of the frame image imaged by the imaging portion 12 of the adjacent mate monitoring camera terminal 1. Conversely, the second coordinate transformation parameter provides projective transformation of the two-dimensional coordinate system of the frame image imaged by the imaging portion 12 of the adjacent mate monitoring camera terminal 1 into the two-dimensional coordinate system of the frame image imaged by the own-terminal's imaging portion 12.

Note that the coordinate transformation information may only be either of the first coordinate transformation parameter or the second coordinate transformation parameter.

The first coordinate transformation parameter and the second coordinate transformation parameter will now be described in more detail below. The first coordinate transformation parameter and the second coordinate transformation parameter are values calculated using frame image actually imaged during installation of the monitoring camera terminal 1.

First, when the installation of the monitoring camera terminal 1 is completed, a tape or the like is used to mark 4 points on the floor in the overlapping area with the adjacent mate monitoring camera terminal 1. Then, the frame image imaged by the own-terminal's imaging portion 12 are processed to detect the coordinate positions (x, y) of the 4 marked points in the frame image. Similarly, the coordinate positions (X, Y) of the 4 marked points in the frame image imaged by the imaging portion 12 of the adjacent mate monitoring camera terminal 1 are acquired from the mate-terminal. Then, for each marked point, the coordinate position is substituted into the following equations to obtain simultaneous equations with eight unknowns.

$X=(a1x+b1y+c1)/(a0x+b0y+1)$ $Y=(a2x+b2y+c2)/(a0x+b0y+1)$

The solutions of the simultaneous equations with eight unknowns are 8 coefficients of a0, b0, a1, b1, c1, a2, b2, and c2. The 8 coefficients are first coordinate transformation parameters with the adjacent mate monitoring camera terminal 1. The monitoring camera terminal 1 stores the first coordinate transformation parameters in the storage portion 14.

Similarly, for each marked point, the coordinate position is substituted into the following equations to obtain simultaneous equations with eight unknowns.

$x=(A1X+B1Y+C1)/(A0X+B0Y+1)$ $y=(A2X+B2Y+C2)/(A0X+B0Y+1)$

The solutions of the simultaneous equations with eight unknowns are 8 coefficients of A0, B0, A1, B1, C1, A2, B2, and C2. The 8 coefficients are second coordinate transformation parameters with the adjacent mate monitoring camera terminal 1. The monitoring camera terminal 1 stores the second coordinate transformation parameters in the storage portion 14.

Figure 4:
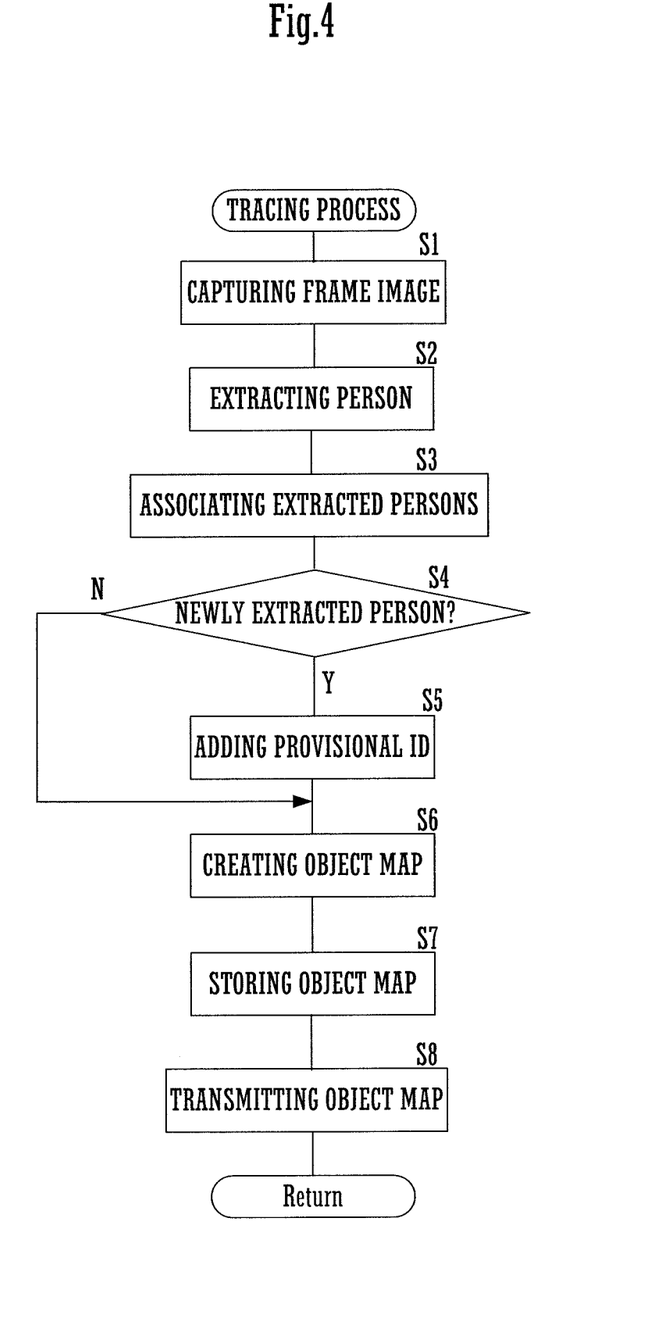
FIG. 4 is a flowchart of a tracing process of the monitoring camera terminal.

The tracing of the suspicious person by the monitoring system will now be described in more detail below. FIG. 4 is a flowchart of the tracing process of each monitoring camera terminal.

The monitoring camera terminal 1 captures a frame image of the monitoring target area imaged by the imaging portion 12 into the image processing portion 13 (S1). The image processing portion 13 processes the frame image captured in S1 to extract the imaged person (S2). The image processing portion 13 associates the person extracted from the previous processed frame image with the person extracted in S2 (S3). The image processing portion 13 uses the spatio-temporal MRF model to extract the person as a person region in units of an 8 pixels×8 pixels block. In S3, the person extracted from the previous processed frame image and the person extracted in S2 may be associated with each other to obtain the moving direction and moving amount of the current extracted person, thereby allowing the tracing of the person.

A person who is extracted in the current process and is not extracted in the previous process (i.e., a current newly extracted person) is added with a provisional ID (S4 and S5).

Figure 5:
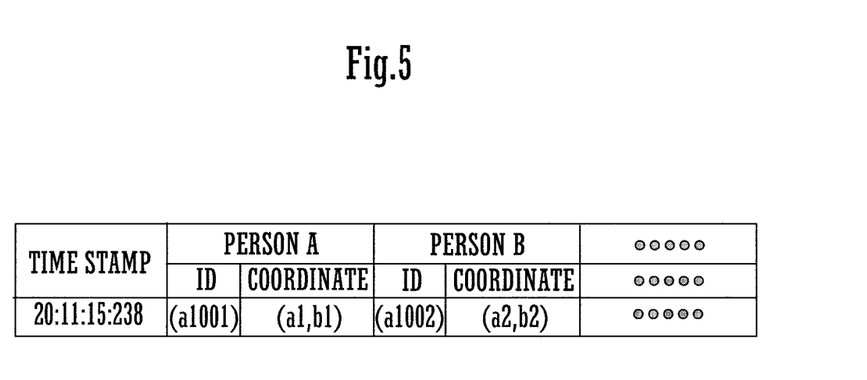
FIG. 5 illustrates an object map.

The image processing portion 13 creates an object map for the current processed frame image (S6). With reference to FIG. 5, the object map is information that associates the ID having been added (or the current provisional ID added) to each current extracted person with the coordinate position in the current processed frame image. The monitoring camera terminal 1 adds a time stamp to the object map. The time stamp may be the time when the frame image is captured into the image processing portion 13 in S1 or the time clocked by the timer 15 when the time stamp is added (the current time).

When the object map is created in S6, the position (hereinafter, referred to as a feet position) at which the current extracted person is in contact with the floor is detected as the coordinate position of the person. Specifically, in acquisition of the above first coordinate transformation parameter and the second coordinate transformation parameter, for each person in touch with a plane (i.e., the floor) passing through the 4 marked points, the coordinate of the center of the lower side of the person region of the person is detected as the coordinate position of the person. The person region is hereinafter referred to as a person's circumscribed rectangle.

The monitoring camera terminal 1 stores the object map created in S6 in the storage portion 14. The monitoring camera terminal 1 also transmits the current created object map (hereinafter, referred to as an own-terminal object map) to the adjacent other monitoring camera terminal 1 (S7 and S8).

Note that when each monitoring camera terminal 1 receives an object map (hereinafter, referred to as a mate-terminal object map) from the adjacent other monitoring camera terminal 1, it stores the mate-terminal object map in the storage portion 14. The monitoring camera terminal 1 distinctively stores the mate-terminal object maps for each adjacent mate monitoring camera terminal 1.

The monitoring camera terminal 1 repeats the above S1 to S7 processes to trace the person in the own-terminal monitoring area.

The ID determination process that determines the ID of the person added with the provisional ID in S4 will now be described below. As described above, a person registered in the object map is added with an ID or a provisional ID that may identify the person. The provisional-ID-added person includes an already-ID-added person (i.e., a person who has already started to be traced) by any other monitoring camera terminals 1 and a currently-no-ID-added person (i.e., a person having entered the area monitored by the monitoring system). To trace the suspicious person over a wide area, if the provisional-ID-added person is an already-ID-added person, the ID determination process disables the current added provisional ID and returns it to the already added ID. If the provisional-ID-added person is a currently-no-ID-added person, the current added provisional ID is determined as the ID of the person.

Note that the ID and the provisional ID added to a person is a unique value that may identify the person. The ID and the provisional ID may be a numeral, a symbol, or a combination thereof. In order that each person may be added with a different ID without notification of the issued ID between the monitoring camera terminals 1, the ID includes a numeral and/or a symbol that allows the monitoring camera terminal 1 that added the ID to be identified by the own and other monitoring camera terminals, according to one or more embodiments of the present invention.

Figure 6:
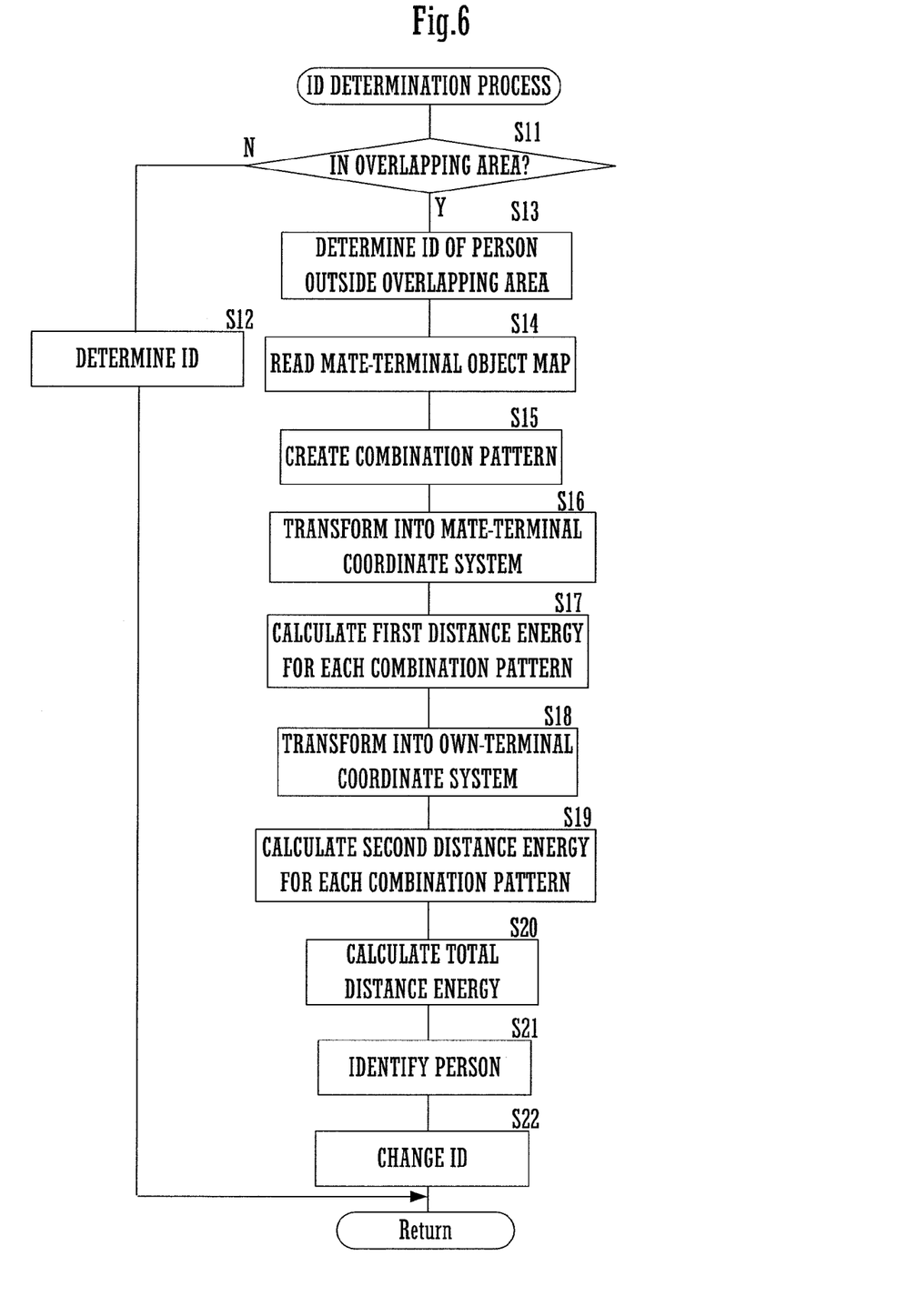
FIG. 6 is a flowchart of an ID determination process.

FIG. 6 is a flowchart of the ID determination process. The ID determination process is performed when an object map registering a provisional-ID-added person is created. First, it is determined whether the current provisional-ID-added persons include a person who resides in the overlapping area with the adjacent other monitoring camera terminal 1 (S11). If the current provisional-ID-added person resides in the overlapping area, the person is a person who has been traced by the adjacent mate monitoring camera terminal 1 including the overlapping area in its monitoring area. Specifically, the person is the already-ID-added person. If the current provisional-ID-added person does not reside in the overlapping area, the person is a person who has not been traced by any other monitoring camera terminals 1. Specifically, the person is the currently-no-ID-added person. If no person resides in the overlapping area in S11, then the monitoring camera terminal 1 determines, for each current provisional-ID-added person, the added provisional ID as the ID (S12).

If any person resides in the overlapping area, then the monitoring camera terminal 1 determines, only for the person outside the overlapping area among the current provisional-ID-added persons, the added provisional ID as the ID (S13). The monitoring camera terminal 1 reads, from the storage portion 14, a mate-terminal object map corresponding in teams of time to the own-terminal object map that has registered the current provisional-ID-added persons (S14). With the own-terminal object map being added with a time stamp at one time and each mate-terminal object map being added with a time stamp at another time, a mate-terminal object map having a minimum absolute time difference with the own-terminal object map is read from the storage portion 14 in S14.

The monitoring camera terminal 1 creates a combination pattern that associates the persons in the overlapping area registered in the own-terminal object map with the persons in the overlapping area registered in the mate-terminal object map on a one-to-one basis (S15). The number of combination patterns created in S15 is 2 if 2 persons reside in the overlapping area, and is 6 if 3 persons reside in the overlapping area, for example.

Further, the monitoring camera terminal 1 uses, for each person in the overlapping area among the persons registered in the current created own-terminal object map, the first coordinate transformation parameter to transform the person's coordinate position into the mate-terminal coordinate system (S16). The monitoring camera terminal 1 calculates a first distance energy for each combination pattern created in S15 (S17). The first distance energy is the total sum of the distances between the persons associated in the corresponding combination patterns, the distances being measured in the mate-terminal coordinate system.

Further, the monitoring camera terminal 1 uses, for each person in the overlapping area among the persons registered in the mate-terminal object map that is read in S14, the second coordinate transformation parameter to transform the person's coordinate position into the own-terminal coordinate system (S18). The monitoring camera terminal 1 calculates a second distance energy for each combination pattern created in S15 (S19). The second distance energy is the total sum of the distances between the persons associated in the corresponding combination patterns, the distances being measured in the own-terminal coordinate system.

The monitoring camera terminal 1 calculates the total distance energy for each combination pattern created in S15 (S20). The total distance energy is, for each combination pattern, the sum of the first distance energy and the second distance energy of the combination pattern.

The monitoring camera terminal 1 determines that the combination pattern in which the minimum total distance energy is obtained in S20 is the appropriate association of the persons in the overlapping area. The association of the persons using the combination pattern of the minimum total distance energy identifies the persons in the overlapping area (S21). For the provisional-ID-added person, the monitoring camera terminal 1 disables the added provisional ID and determines the ID already added to the identified person as the ID (S22). In S22, the provisional ID is replaced with the ID already added to the identified person in the object map.

Therefore, the persons in the overlapping area may be accurately identified between the adjacent monitoring camera terminals 1 and thus a suspicious person having had suspicious behavior may be traced over a wide area. It may not be necessary to obtain three-dimensional information of a person using a stereo camera or the like, thus sufficiently limiting the cost increase.

Note that although in FIG. 6, the identification accuracy of the person in the overlapping area is ensured by using the sum of the first distance energy and the second distance energy as the total distance energy, either of the first distance energy or the second distance energy may the total distance energy. In this way, either of the processes (S16 and S17) or the processes (S18 and S19) may be unnecessary, thus reducing the process load on the monitoring camera terminal 1.

The persons overlapping in the monitoring target area may prevent the imaging of the persons' feet. Specifically, in the frame image, the persons' feet positions may not be detected. In this case, the object map may be created in S6 with the feet positions of the imaged persons determined in the following process. The process may be a process performed only for the persons in the overlapping area, or a process performed for all persons in the monitoring area.

First, the image processing portion 13 is provided with a function of learning a person's reference height to perspective in the frame image imaged by the imaging portion 12, and storing the reference height in the storage portion 14.

Figure 7:
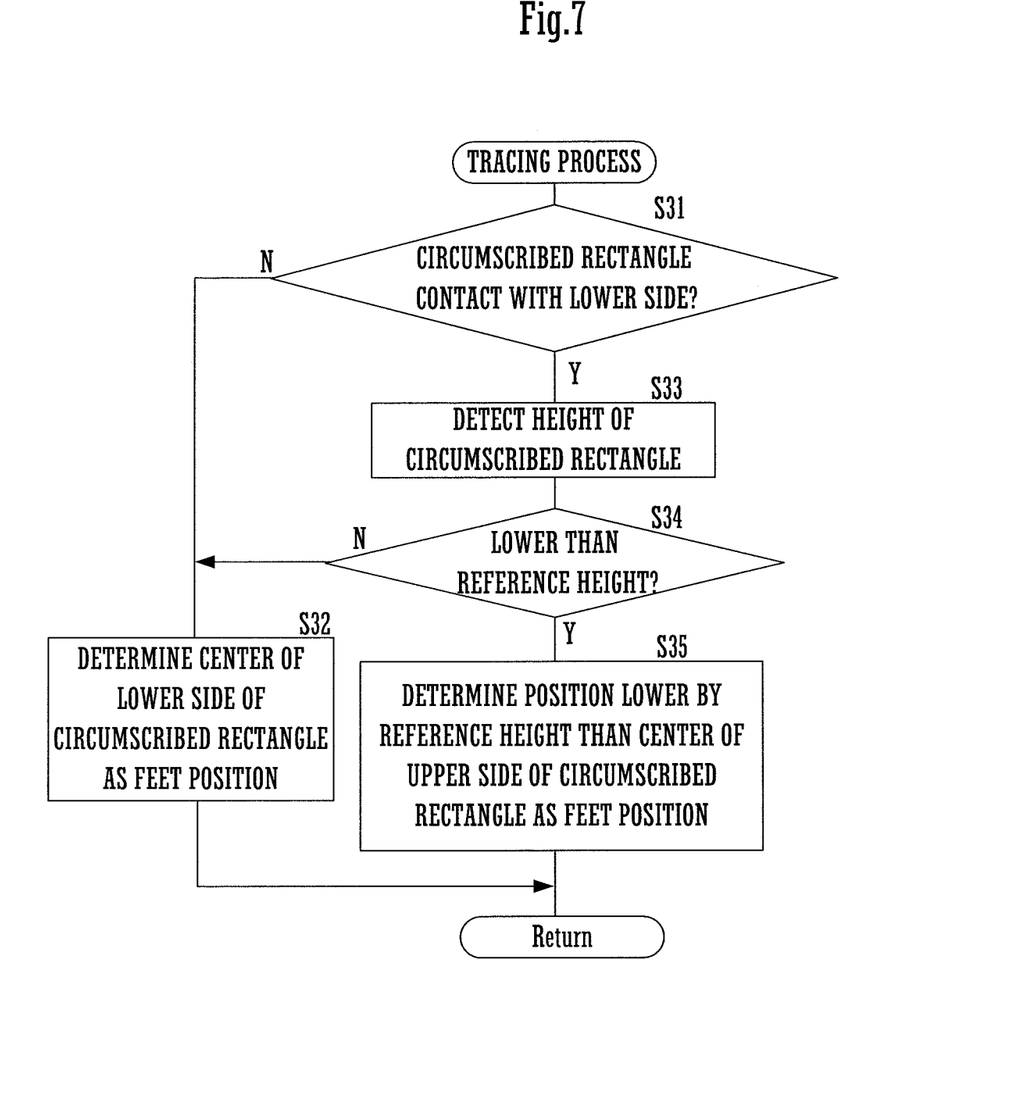
FIG. 7 is a flowchart of a feet position determination process.

FIG. 7 is a flowchart of a process of determining the feet position. A target person whose feet position is to be determined is extracted from a person region that is a circumscribed rectangle. The image processing portion 13 determines whether the lower side of the circumscribed rectangle is contact with a person region corresponding to a different person (S31). If the lower side is not in contact with a person region corresponding to a different person in S31, then the image processing portion 13 determines that the person's feet is imaged. The image processing portion 13 then determines the center of the lower side of the person's circumscribed rectangle as the feet position (S32).

If the lower side is in contact with a person region corresponding to a different person in S31, then the image processing portion 13 detects the height of the circumscribed rectangle of that person region (S33). The image processing portion 13 compares the reference height stored for that person's imaging position and the height detected in S33 (S34).

If the image processing portion 13 determines that the detected height is higher than the reference height in S34, then it proceeds to S32. In S32, the image processing portion 13 determines the center of the lower side of the person's circumscribed rectangle as the feet position. If the image processing portion 13 determines that the detected height is lower than the reference height in S34, then it proceeds to S35. In S35, the image processing portion 13 determines that a position lower, by the reference height, than the center coordinate of the upper side of the circumscribed rectangle of the person region corresponding to the person is the person's feet position.

Thus, even for the person in the monitoring target area whose feet are not imaged due to persons overlapping, the person's feet position may be estimated appropriately.

In the above description, it is assumed that the time clocked by the own-terminal timer 15 and the time clocked by the mate-terminal timer 15 are in general synchronism with each other. Taking into account the time lag, a process of identifying the person in the overlapping area will be described below.

Again in this case, each monitoring camera terminal 1 performs the tracing process shown in FIG. 4.

Figure 8:
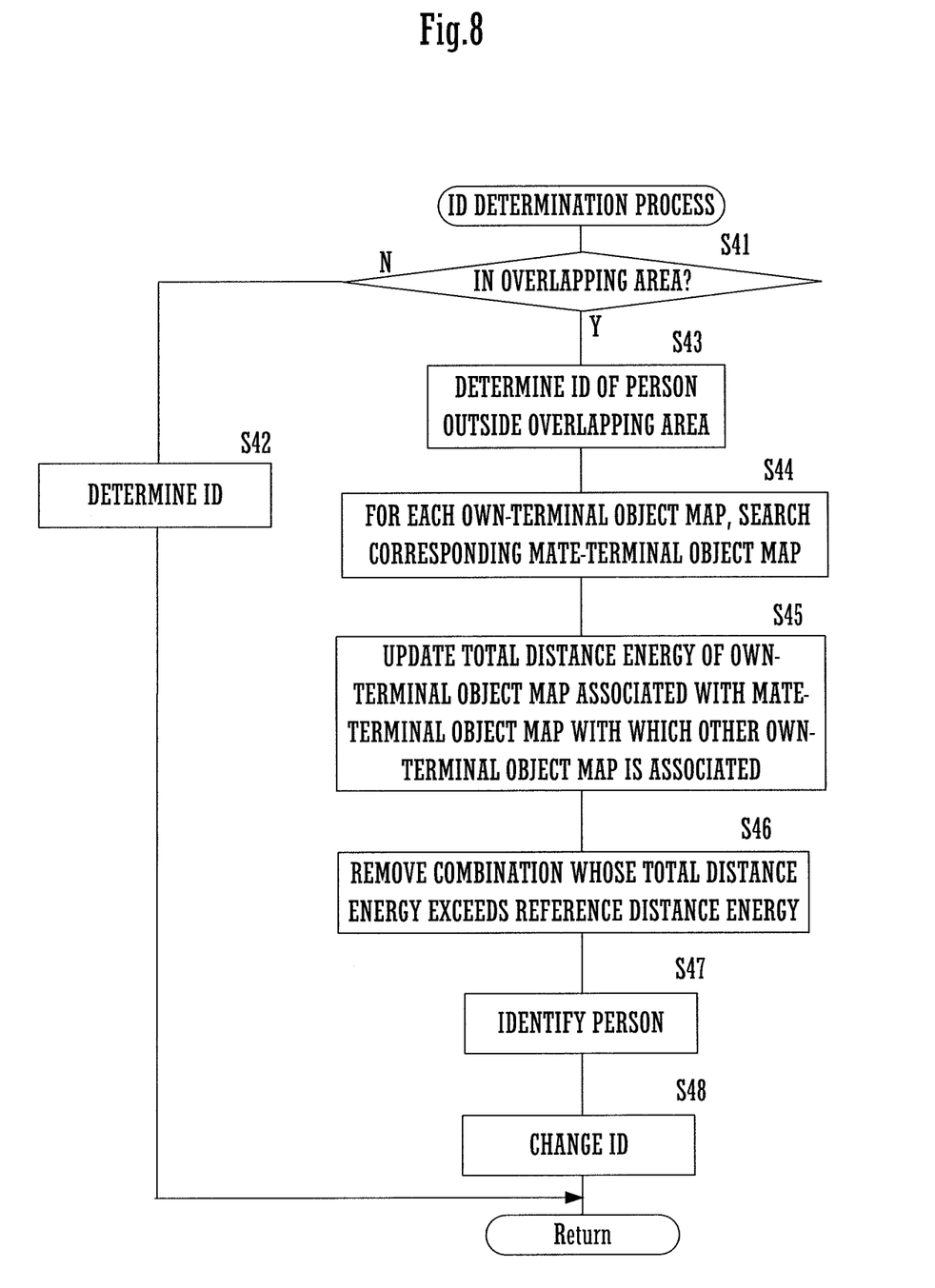
FIG. 8 is a flowchart of another ID determination process.

FIG. 8 is a flowchart of the ID determination process in this case. The ID determination process is performed when an object map that registers a provisional-ID-added person is created. First, it is determined whether the current provisional-ID-added persons include a person who resides in the overlapping area with the adjacent other monitoring camera terminal 1 (S41). If the monitoring camera terminal 1 determines in S41 that no person resides in the overlapping area, then it determines, for each current provisional-ID-added person, the added provisional ID as the ID (S42). The steps of S41 and S42 are processes similar to the above S11 and S12, respectively.

If any person resides in the overlapping area, then the monitoring camera terminal 1 determines, only for the person who does not reside in the overlapping area among the current provisional-ID-added persons, the added provisional ID as the ID (S43). The step of S43 is a process similar to the above S13.

Then, the monitoring camera terminal 1 searches, for each of a predetermined number (for example, 8) of object maps created after the own-terminal object map that has registered the current provisional-ID-added persons, the corresponding mate-terminal object map (S44). In S44, the following process is performed for each own-terminal object map.

First, all mate-terminal object maps are extracted that are added with a time stamp within a predetermined time difference (for example, −200 ms to +200 ms) with respect to the time stamp of the own-terminal object map to be processed.

Then, for each mate-terminal object map extracted here, a combination pattern is created that associates the persons in the overlapping area of the own-terminal object map with those of the mate-terminal object map on a one-to-one basis. The total distance energy is then calculated for each created combination pattern. The method of calculating the total distance energy is described above and thus its detailed description is omitted here. It is then assumed that the minimum total distance energy is the total distance energy with respect to the current target mate-terminal object map.

Further, the mate-terminal object map having a minimum total distance energy is determined as the mate-terminal object map corresponding to the current own-terminal object map to be processed.

Figure 9:
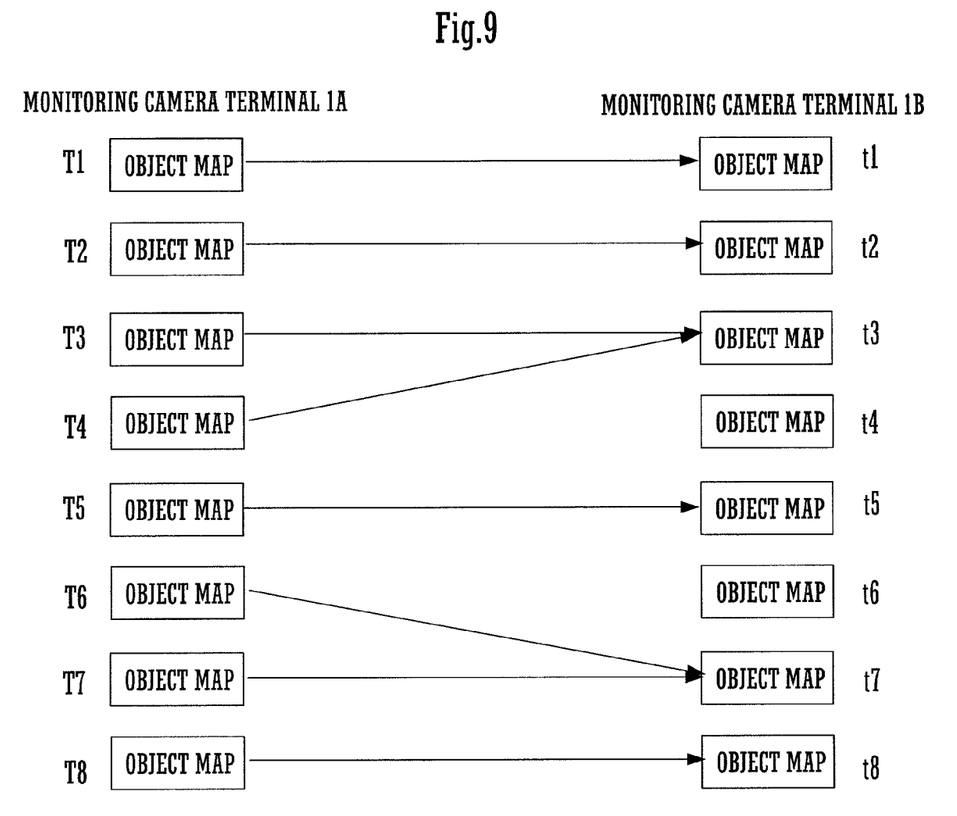
FIG. 9 illustrates association of the object maps.

FIG. 9 shows a monitoring camera terminal 1A having own-terminal object maps added with time stamps at time T1 to T8, an adjacent monitoring camera terminal 1B having mate-terminal object maps, and an search result by the monitoring camera terminal 1A for the mate-terminal object maps corresponding to the own-terminal object maps. In this example, if two mate-terminal object maps having time stamps at t1 and t2 are extracted for the own-terminal object map having a time stamp at time T1, the total distance energy with the mate-terminal object map having a time stamp at t1 and the total distance energy with the mate-terminal object map having a time stamp at t2 are calculated. Then, the total distance energy with the mate-terminal object map having a time stamp t1 and the total distance energy with the mate-terminal object map having a time stamp t2 are compared. Then, the mate-terminal object map at a time stamp t1 having a smaller (minimum) total distance energy is associated with the own-terminal object map at a time stamp T1.

Further, in this process, as shown in FIG. 9, a plurality of own-terminal object maps (such as T3 and T4, and T6 and T7) may be associated with the same mate-terminal object map (such as t3 and t7). Further, there may be a mate-terminal object map (such as t4 and t6) with which no own-terminal object map is associated.

The monitoring camera terminal 1 updates the total distance energy of the own-terminal object maps (T3, T4, T6, and T7 shown in FIG. 9) by adding a predetermined penalty value thereto. Those own-terminal object maps (T3, T4, T6, and T7) are each associated with a mate-terminal object map with which other own-terminal object map is also associated (S45). The penalty value may be set to any value depending on the installation environment or the like.

From the combinations of the own-terminal object maps and the mate-terminal object maps associated in S44, a combination whose total distance energy exceeds a predetermined reference distance energy is extracted and removed (S46). The reference distance energy is set to an amount that allows detecting whether the own-terminal object maps and the mate-terminal object maps are inappropriately associated with each other, and whether the combinations of the persons in the overlapping area are inappropriately associated, and the like. If, for example, the monitoring camera terminal 1 has a communication failure with the mate monitoring camera terminal 1 and the failure causes lack of the appropriate mate-terminal object map corresponding to the own-terminal object map, the monitoring camera terminal 1 may perform inappropriate association with the mate-terminal object maps.

Using the remaining combinations of the own-terminal object maps and the mate-terminal object maps, the monitoring camera terminal 1 identifies the persons in the overlapping area (S47). In S47, for example, among the combinations of the own-terminal object maps and the mate-terminal object maps, the combination having a minimum total distance energy is extracted. In the object map combination thus extracted, the combination of the persons in the overlapping area identifies the persons in the overlapping area. Further, among the remaining combinations of the own-terminal object maps and the mate-terminal object maps, the combination that has the most combinations of the persons in the overlapping area identify the persons in the overlapping area.

If the identified person is a provisional-ID-added person, the monitoring camera terminal 1 disables the added provisional ID and determines the ID already added to the person as the ID (S48). In S48, the provisional ID is replaced with the ID already added to the identified person in the object map.

Therefore, even if there is a time lag between the time clocked by the own-terminal timer 15 and the time clocked by the mate-terminal timer 15, the persons in the overlapping area may be accurately identified.

Figure 10:
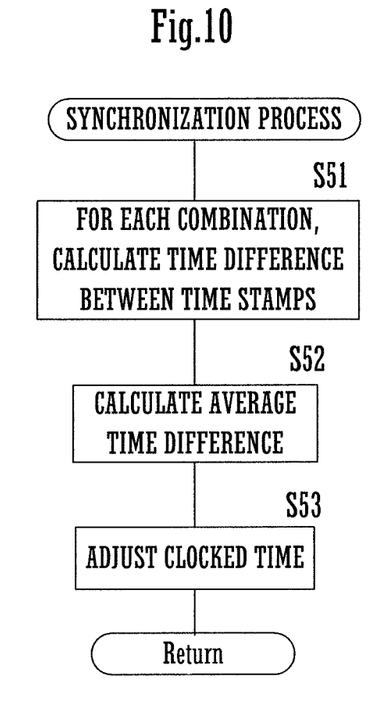
FIG. 10 is a flowchart of a time synchronization process.

Further, a time synchronization process may be performed. The time synchronization process uses the combination of the own-terminal object maps and the mate-terminal object maps used to identify the persons in the overlapping area in S47 to synchronize the time clocked by the own-terminal timer 15 with the time clocked by the timer 15 of the mate monitoring camera terminal 1. FIG. 10 is a flowchart of the time synchronization process.

For each combination of the own-terminal object maps and the mate-terminal object maps used to identify the persons in the overlapping area in S47, the time difference between the time stamps is calculated (S51), and the average time difference is obtained (S52). The monitoring camera terminal 1 then adjusts the time clocked by the timer 15 by the average time difference calculated in S52 (S53). The time clocked by the timer 15 may thus be synchronized with the adjacent monitoring camera terminal 1.

Time stamps whose time difference is different from the average time difference calculated in S52 by a certain amount of time or more may be removed. Then, the remaining time stamps may be used to recalculate the average time difference to adjust the time clocked by the timer 15. This process may be repeated until the time stamps disappear whose time difference is different from the average time difference by a certain amount of time or more. Otherwise, the process may only be repeated a predetermined number of times.

Although the above embodiments have been described with respect to a person as the traced object, the object is not limited to a person and may be any other types of mobile objects including a vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

EXPLANATION OF REFERENCE NUMBERS

1(1A to 1H) Monitoring Camera Terminal
11 Control portion
12 Imaging portion
13 Image processing portion
14 Storage portion
15 Timer
16 Communication portion

The invention claimed is:

1. A monitoring camera terminal comprising;
an imaging portion for imaging a monitoring target area allocated to an own-terminal;
an object extraction portion for processing a frame image imaged by the imaging portion to extract an imaged object;
an ID addition portion for adding an ID to the object extracted by the object extraction portion;
an object map creation portion for creating, for each object extracted by the object extraction portion, an object map associating the ID added to the object with a coordinate position in the frame image; and
a tracing portion for tracing an object in the monitoring target area allocated to the own-terminal using the object maps created by the object map creation portion,
wherein the monitoring camera terminal further comprises:
a mate-terminal object map acquisition portion for acquiring a mate-terminal object map created by a mate-terminal through data communication with the mate-terminal, the mate-terminal having an monitoring target area allocated thereto, the monitoring target area being partially overlapping with the own-terminal monitoring target area;
a coordinate transformation information storage portion for storing coordinate transformation information of the relative position relationship between the coordinate position of the own-terminal frame image and the coordinate position of the mate-terminal frame image; and
an identification portion for identifying the own-terminal-extracted object and the mate-terminal-extracted object in the overlapping area where the own-terminal monitoring target area and the mate-terminal monitoring target area are overlapping with each other, and wherein the identification portion uses the coordinate transformation information stored by the coordinate transformation information storage portion to transform the own-terminal-extracted object positions and the mate-terminal-extracted object positions into positions in a common coordinate system, and identifying the objects in the overlapping area using the distance between the own-terminal-extracted objects and the mate-terminal-extracted objects in the common coordinate system.

2. The monitoring camera terminal according to claim 1, wherein the identification portion identifies the objects in the overlapping area using, among combinations associating the own-terminal-extracted objects with the mate-terminal-extracted objects in the overlapping area on a one-to-one basis, the combination providing the minimum total sum of the distances between the associated objects.

3. The monitoring camera terminal according to claim 2, wherein the object map creation portion sets, for each object extracted by the object extraction portion, the object position to the coordinate of the relevant object in a ground plane.

4. The monitoring camera terminal according to claim 3, further comprising a matching portion for matching, in terms of time, the own-terminal object maps created by the object map creation portion and the mate-terminal object maps acquired by the mate-terminal object map acquisition portion using the distances between the objects in the overlapping area.

5. The monitoring camera terminal according to claim 4, wherein the identification portion identifies the objects in the overlapping area using a plurality of object map sets, each object map set including the own-terminal object maps and the mate-terminal object maps matched by the matching portion in terms of time.

6. The monitoring camera terminal according to claim 5, wherein the identification portion calculates the distances between the own-terminal-extracted objects and the mate-terminal-extracted objects by adding, for the object map set in which the own-terminal object map is matched, by the matching portion, in terms of time to a mate-terminal object map to which other own-terminal object map is also matched, a predetermined penalty distance in the calculation of the distances between the objects in the overlapping area.

7. The monitoring camera terminal according to claim 2, further comprising a matching portion for matching, in terms of time, the own-terminal object maps created by the object map creation portion and the mate-terminal object maps acquired by the mate-terminal object map acquisition portion using the distances between the objects in the overlapping area.

8. The monitoring camera terminal according to claim 7, wherein the identification portion identifies the objects in the overlapping area using a plurality of object map sets, each object map set including the own-terminal object maps and the mate-terminal object maps matched by the matching portion in terms of time.

9. The monitoring camera terminal according to claim 8, wherein the identification portion calculates the distances between the own-terminal-extracted objects and the mate-terminal-extracted objects by adding, for the object map set in which the own-terminal object map is matched, by the matching portion, in terms of time to a mate-terminal object map to which other own-terminal object map is also matched, a predetermined penalty distance in the calculation of the distances between the objects in the overlapping area.

10. The monitoring camera terminal according to claim 1, wherein the object map creation portion sets, for each object extracted by the object extraction portion, the object position to the coordinate of the relevant object in a ground plane.

11. The monitoring camera terminal according to claim 10, further comprising a matching portion for matching, in terms of time, the own-terminal object maps created by the object map creation portion and the mate-terminal object maps acquired by the mate-terminal object map acquisition portion using the distances between the objects in the overlapping area.

12. The monitoring camera terminal according to claim 11, wherein the identification portion identifies the objects in the overlapping area using a plurality of object map sets, each object map set including the own-terminal object maps and the mate-terminal object maps matched by the matching portion in terms of time.

13. The monitoring camera terminal according to claim 12, wherein the identification portion calculates the distances between the own-terminal-extracted objects and the mate-terminal-extracted objects by adding, for the object map set in which the own-terminal object map is matched, by the matching portion, in terms of time to a mate-terminal object map to which other own-terminal object map is also matched, a predetermined penalty distance in the calculation of the distances between the objects in the overlapping area.

14. The monitoring camera terminal according to claim 1, further comprising a matching portion for matching, in terms of time, the own-terminal object maps created by the object map creation portion and the mate-terminal object maps acquired by the mate-terminal object map acquisition portion using the distances between the objects in the overlapping area.

15. The monitoring camera terminal according to claim 14, wherein the identification portion identifies the objects in the overlapping area using a plurality of object map sets, each object map set including the own-terminal object maps and the mate-terminal object maps matched by the matching portion in terms of time.

16. The monitoring camera terminal according to claim 15, wherein the identification portion calculates the distances between the own-terminal-extracted objects and the mate-terminal-extracted objects by adding, for the object map set in which the own-terminal object map is matched, by the matching portion, in terms of time to a mate-terminal object map to which other own-terminal object map is also matched, a predetermined penalty distance in the calculation of the distances between the objects in the overlapping area.

17. The monitoring camera terminal according to any of claim 16, wherein
the object map creation portion adds, to the created object map, a time stamp at the creation time, and
the monitoring camera terminal further comprises a time adjustment portion for adjusting the time clocked by the own-terminal using the time stamps added to the own-terminal object maps and the mate-terminal object maps, the own-terminal and mate-terminal object maps being matched in terms of time by the matching portion.

18. The monitoring camera terminal according to any of claim 15, wherein
the object map creation portion adds, to the created object map, a time stamp at the creation time, and
the monitoring camera terminal further comprises a time adjustment portion for adjusting the time clocked by the own-terminal using the time stamps added to the own-terminal object maps and the mate-terminal object maps, the own-terminal and mate-terminal object maps being matched in terms of time by the matching portion.

19. The monitoring camera terminal according to claim 14, wherein the object map creation portion adds, to the created object map, a time stamp at the creation time, and the monitoring camera terminal further comprises a time adjustment portion for adjusting the time clocked by the own-terminal using the time stamps added to the own-terminal object maps and the mate-terminal object maps, the own-terminal and mate-terminal object maps being matched in terms of time by the matching portion.

* * * * *